(12) United States Patent
Robinson

(10) Patent No.: US 9,147,265 B2
(45) Date of Patent: Sep. 29, 2015

(54) SYSTEM AND METHOD FOR RAPID CLUSTER ANALYSIS OF HYPERSPECTRAL IMAGES

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 185 days.

(21) Appl. No.: 13/488,255

(22) Filed: Jun. 4, 2012

(65) Prior Publication Data

US 2013/0322760 A1    Dec. 5, 2013

(51) Int. Cl.
| | |
|---|---|
| G06K 9/46 | (2006.01) |
| G06T 9/00 | (2006.01) |
| G06K 9/00 | (2006.01) |
| G06K 9/62 | (2006.01) |

(52) U.S. Cl.
CPC ............ *G06T 9/007* (2013.01); *G06K 9/0063* (2013.01); *G06K 9/6218* (2013.01); *G06K 9/6232* (2013.01); *G06K 2009/4657* (2013.01)

(58) Field of Classification Search
USPC ......... 382/103, 159, 164, 191, 254, 276, 277; 345/589, 606; 702/194; 348/144, 169, 348/269
See application file for complete search history.

(56) References Cited

U.S. PATENT DOCUMENTS

| | | | |
|---|---|---|---|
| 6,075,891 A * | 6/2000 | Burman | 382/191 |
| 6,208,752 B1 | 3/2001 | Palmadesso et al. | |
| 6,282,301 B1 * | 8/2001 | Haskett | 382/103 |
| 6,356,646 B1 * | 3/2002 | Spencer | 382/103 |
| 6,504,943 B1 * | 1/2003 | Sweatt et al. | 382/103 |
| 6,594,403 B1 * | 7/2003 | Bozdagi et al. | 382/284 |
| 6,665,438 B1 | 12/2003 | Lin | |
| 6,701,021 B1 | 3/2004 | Qian et al. | |

(Continued)

FOREIGN PATENT DOCUMENTS

| | | |
|---|---|---|
| CN | 101763445 A | 6/2010 |
| WO | 2010056254 A1 | 5/2010 |
| WO | 2010141114 A2 | 12/2010 |

OTHER PUBLICATIONS

Memarsadeghi, N. et al., "A Fast Implementation of the Isodata Clustering Algorithm", IJCGA, vol. 17, No. 1, pp. 71-103 (2007).

(Continued)

*Primary Examiner* — Vu Le
*Assistant Examiner* — Aklilu Woldemariam
(74) *Attorney, Agent, or Firm* — Burns & Levinson LLP; Joseph M. Maraia

(57) ABSTRACT

A system for processing hyperspectral image data includes one or more storage mediums comprising reduced dimensionality data associated with hyperspectral image data, a set of basis vectors associated with generating the reduced dimensionality data from the hyperspectral image data, and anomaly data associated with the hyperspectral image data. The system also includes one or more processors configured to establish an initial set of clusters for the reduced dimensionality data, the initial set of clusters having cluster centers being based on the set of basis vectors. The one or more processors are also configured to iteratively assign pixels from the reduced dimensionality data to one of the set of clusters and modify the cluster center based on the assigned pixels. The one or more processors are further configured to output clustered pixel assignments and modified cluster centers associated with the hyperspectral image data. Associated methods of processing are also disclosed.

19 Claims, 4 Drawing Sheets

(56) References Cited

U.S. PATENT DOCUMENTS

| | | | |
|---|---|---|---|
| 6,750,964 B2 | 6/2004 | Levenson et al. | |
| 6,763,136 B1* | 7/2004 | Sweet | 382/197 |
| 6,778,702 B1* | 8/2004 | Sweet | 382/191 |
| 6,782,138 B1 | 8/2004 | Leisner et al. | |
| 6,804,400 B1 | 10/2004 | Sharp | |
| 6,859,275 B2 | 2/2005 | Fateley et al. | |
| 6,940,999 B2 | 9/2005 | Lin | |
| 6,952,499 B1 | 10/2005 | Vititoe | |
| 7,035,431 B2* | 4/2006 | Blake et al. | 382/103 |
| 7,180,588 B2 | 2/2007 | Geshwind et al. | |
| 7,194,111 B1 | 3/2007 | Schaum et al. | |
| 7,251,376 B2 | 7/2007 | Qian et al. | |
| 7,356,201 B2 | 4/2008 | Gunther et al. | |
| 7,463,778 B2 | 12/2008 | Damera-Venkata | |
| 7,486,734 B2 | 2/2009 | Machida | |
| 7,551,785 B2* | 6/2009 | Qian et al. | 382/232 |
| 7,562,057 B2* | 7/2009 | Maggioni et al. | 706/20 |
| 7,680,337 B2 | 3/2010 | Gruninger et al. | |
| 7,773,828 B2 | 8/2010 | Sakata et al. | |
| 8,078,009 B2* | 12/2011 | Riley et al. | 382/299 |
| 8,150,195 B2 | 4/2012 | Demirci et al. | |
| 8,165,344 B2 | 4/2012 | Shirasaka | |
| 8,175,393 B2 | 5/2012 | Robinson et al. | |
| 8,315,472 B2 | 11/2012 | Robinson et al. | |
| 8,391,961 B2 | 3/2013 | Levenson et al. | |
| 2003/0012398 A1 | 1/2003 | Sunshine et al. | |
| 2003/0055610 A1* | 3/2003 | Webber | 702/194 |
| 2004/0218172 A1 | 11/2004 | DeVerse et al. | |
| 2005/0047663 A1* | 3/2005 | Keenan et al. | 382/225 |
| 2006/0188161 A1 | 8/2006 | Gruninger et al. | |
| 2006/0247514 A1 | 11/2006 | Panasyuk et al. | |
| 2009/0074297 A1* | 3/2009 | Robinson | 382/191 |
| 2010/0303371 A1* | 12/2010 | Robinson et al. | 382/254 |
| 2012/0224782 A1 | 9/2012 | Robinson et al. | |

OTHER PUBLICATIONS

Wei, C-P, et al., "Empirical Comparison of Fast Clustering Algorithms for Large Data Sets", Proceedings of the 33rd Hawaii Intl. Conf. on System Sciences, pp. 1-10 (2000).

Yan, D, et al., "Fast Approximate Spectral Clustering", KDD'09, (9 pages) Jun. 28-Jul. 1, 2009, Paris France.

Caefer, Analysis of false alarm distributions in the development and evaluation of hyperspectral point target detection algorithms, Optical Engineering, 2007.

Foy et al., "Decision Boundaries in Two Dimensions for Target Detection in Hyperspectral Imagery," Optics Express; 17(20):17391-17411(2009).

Funk et al., "Clustering to improve matched filter detection of weak gas plumes in hyperspectral thermal imagery," IEEE Transactions on Geoscience and Remote Sensing; 39(7):1410-1420 (2001).

Halper, "Global, Local and Stochastic Background Modeling for Target Detection in Mixed Pixels," The MITRE Corp; Case#10-0838; 13 pages.

Kerekes et al., "Hyperspectral Imaging System Modeling" Lincoln Laboratory Journal; 14(1):117-130 (2003).

Manolakis et al., "Detection Algorithms for hyperspectral imaging data exploitation," MIT Lincoln Laboratory ASAP 2002; 9 pages (2002).

Manolakis; "Standoff detection and identification of chemical plumes with long wave hyperspectral imaging sensors," MIT Lincoln Laboratory; RTO-MP-SET-151; pp. [2-1]-[2-10] 2009.

Messinger et al., "Detection of gaseous effluents from airborne LWIR hyperspectral imagery using physics-based signatures," Institute of Technology, pp. 712-723.

Ientilucci, et al., "Target detection in a structured background environment using an infeasibility metric in an invariant space; algorithms and technologies for multispectral, hyperspectral and ultraspectral imagery XI;" Proceedings of SPIE, v. 5806, pp. 491-502, 2005.

Jacobsen et al., Monitoring grasslands using convex geometry and partial unmixing—a case study: 1st EARSel Workshop on imaging spectroscopy, pp. 309-316; Oct. 1998.

Kruse et al., Extraction of compositional information for trafficability mapping from hyoperspectral data; SPIE international symposium on AeroSense, vol. 4049, pp. 262-273; Apr. 2000.

Mundt et al., Partial unmixing of hyperspectral imagery: Theory and Methods: American Society of Photogrammetry and Remote Sensing Annual Conference, p. 1-12; May 2007.

Nielsen: Spectral mixture analysis: Linear and semi-parametric full and iterated partial unmixing in multi- and hyperspectral image data: International Journal of Computer Vision: v. 42: Nos. 1 and 2, pp. 17-37: 2001.

Smith: Introduction to hyperspectral imaging; http://microimages.com; p. 1-24, Jul. 14, 2006.

Ding et al., "Adaptive dimension reduction for clustering high dimensional data," Data Mining, 2002. Proceedings. 2002 IEEE International Conference on Maebashi City, Japan, Dec. 9-12, 2002, Los Alamitos, CA, USA, IEEE Comput. Soc. US, Dec. 9, 2002, pp. 147-154.

Bowles, et al. ed. Chein, "An optical real-time adaptive spectral identification system (ORASIS)", Apr. 6, 2007, Hyperspectral Data Exploitation: Theory and Applications, Wiley, Hoboken, NJ pp. 77-106.

Jing Zhang et al., "A Novel classified residual DCT for Hyperspectral Images Scalable Compression," (Abstract) 26, Picture coding symposium, Jul. 11, 2007-Sep. 11, 2007, Lisbon.

Gruninger et al, "The sequential maximum angle convex cone (SMACC) endmember model," SPIE Bellingham, WA, Apr. 30, 2004.

Xuetao Tao et al., "Orthogonal Bases Approach for the Decomposition of Mixed Pixels in Hyperspectral Imagery," IEEE Geoscience and Remote Sensing Letters, IEEE Service Center, NY v. 6, n. 2 Apr. 1, 2009.

Acito, N., et al., "Subspace-Based Striping Noise Reduction in Hyperspectral Images", IEEE Transactions on Geoscience and Remote Sensing, IEEE Service Center, Piscataway, NJ, US, vol. 49, No. 4, Apr. 1, 2011, p. 1325-1342.

Dyk, A., et al., "Processing Hyperion and Ali for Forest Classification," IEEE Transactions on Geoscience and Remote Sensing, IEEE, Service Center, Piscataway, NH, US vol. 41, No. 6, Jun. 1, 2003, p. 1321-1331.

Datt, B. et al., "Preprocessing eo-1 Hyperion Hyperspectral Data to Support the Application of Agricultural Indexes", IEEE Service Center, Piscataway, NJ, US, vol. 41, No. 6, Jun. 1, 2003, p. 1246-1259.

Han, T., et al., "Detection and Correction of Abnormal Pixels in Hyperion Images", IGARSS 2002 International Geoscience and Remote Sensing Symposium, Toronto, Sweden, Jun. 24-28, 2002; [IEEE International Geoscience and Remote Sensing Symposium], New York, NY vol. 3, Jun. 24, 2002, p. 1327-1330.

Parente, M.,"A New Approach to Denoising CRISM Images", 39th Lunar and Planetary Science Conference, Mar. 10-14, 2008, Mar. 1, 2008, LPI Contribution No. 1391, p. 2528.

Manolakis et al., "Is There a Best Hyperspectral Detection Algorithm?", SPIE—Newsroom; pp. 1-3 (2209).

Boardman, J., et al., Mapping Target Signatures VIA Partial Unmixing of Aviris Data, Citeseer 1995.

Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT, Haifa 32000, Israel, Retrieved from Internet:<URL: http://webee.technion.ac.il/uploads/file/publication/684.pdf.

Sun, L., et al., "Improved Iterative Error Analysis for Endmember Extraction from Hyperspectral Imagery", SPIE Imaging Spectrometry XIII, vol. 708, pp. 400-407, Intro., Sec 2.2—pp. 3-5 (Aug. 2008).

Veganzones, M.A., et al., "Endmember Extraction Methods: A Short Review", pp. 400-407 (Sep. 2008).

Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).

Plaza, A., et al., "Spatial/Spectral Endmember Extraction by Multi-dimensional Morphological Operations", IEEE Transactions on Geoscience and Remote Sensing, IEEE Service Ctr., NJ, US, vol. 40, No. 9, pp. 2025-2029 (Sep. 2002).

(56) References Cited

OTHER PUBLICATIONS

Plaza, A., et al., "A New Approach to Mixed Pixel Classification of Hyperspectral imagery based on extended Morphological profiles", Pattern Recognition, Elsevier, vol. 37, No. 6, pp. 1097-1116 (Jun. 2004).

Rogge, D.M., et al., "Integration of Spatial-Spectral Information for the Improved Extraction of Endmembers", Remote Sensing of Environment, Elsevier, vol. 110, No. 3, pp. 287-303 (Aug. 2007).

Filippi, A.M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).

Keshava, N., et al., "Sprectral Unmixing", IEEE Signal Processing Magazine, vol. 19, No. 1, pp. 44-57, Jan. 1, 2002, XP011093745.

Rogge, D. M., et al., "Iterative Spectral Unmixing for Optimizing Per-Pixel Endmemeber Sets", IEEE Transactions on Geoscience and Remote Sensing, IEE Service Center, vol. 4, No. 12, pp. 3725-3736 (Dec. 2006).

Plaza, Antonio, et al., "A Quantitive and Comparative Analysis of Endmemeber Extraction Algorithms From Hyperspectral Data", IEEE 2004.

Robinson, I., et al. "Comparison of Hyperspectral Sub-Pixel Detection with and Without a Prior Knowledge of Target Features", Aerospace Conference, 1998 IEEE Snowmass at Aspen, Colorado, Mar. 21-28, 1998, vol. 5, pp. 183-189, Mar. 21, 1998, XP010287059, ISBN 978-0-7803-4311-5.

Winter, Michael, "Comparison of Approaches for Determining Endmembers in Hyperspectral Data", IEEE 2000.

Winter, Michael, "N-FINDR: An Algorithm for Fast Autonomous Spectral End-member Determination in Hyperspectral Data", SPIE 1999.

Ulug Bayazit, "Region Adaptive Spectral Transformation for Wavelet Based Color Image Compression", Image Processing (CIP), 2009 16th IEEE International Conference on, IEEE, Piscataway, NJ, Nov. 7, 2009, pp. 2817-2820, Section 2 and 3.

Dohyun Ahn et al., "Rate-Distortion Optimized Image Compression Using Generalized Principal Component Analysis", Acoustics, Speech and Signal Processing, 2006. ICASSP 2006 Proceedings, 2006 IEEE International Conference on Toulouse, France 14-19, May 14, 2006, pp. 5-8.

Manolakis et al., "Hyperspectral Image Processing for Automatic Target Detection Applications,", http://www.cis.rit.edu/-cnspci/references/dip/manolakis2003.pdf, 2003.

Marco F. Durarte et al., "Structured Compressed Sensing: From Theory to Applications" IEEE Transactions on Signal Processing, IEEE Service Center, New York, vol. 59, No. 9, Sep. 1, 2011, pages.

Pickering M R et al., "Compression of Hyperspectral Data Using Vector Quantisation and the Discrete Cosine Transform", Image Processing, 2000, Proceedings. 2000 International Conference of Sep. 10-13, 2000, IEEE, Piscataway, NJ, Sep. 10, 2000, pp. 195-198, vol. 2.

International Preliminary Report on Patentability dated Aug. 29, 2011 of PCT/US2010/024192 filed Feb. 12, 2010 (21 pages).

Meza et al., "Applied Non-Uniformity Correction Algorithm for Striping Noise Removal in Hyperspectral Images", [Downloaded from the Internet: http://nuc.die.udec.cl/publications/papers/2010-NUCStrippingNoise.pdf on Nov. 20, 2012].

Jiang, Ming-Fei, et al., "A Robust estimation of Virtual Dimensionality in Hyperspectral Imagery," Computational Problem-Solving (ICCP), 2010 International Conference on, vol., No., pp. 374-378, Dec. 3-5, 2010.

Harsanyi, Joseph C., et al., "Hyperspectral Image Classification and Dimensionality Reduction: An Orthogonal Subspace Projection Approach," Zeee Tmns. on Geoscience and Remote Sensing, 32(4), Jul. 1994.

Neville, R.A., et al., "Automatic Endmember Extraction from Hyperspectral Data for Mineral Exploration", 4th Int. Airborne remote Sensing Conf. Exhibition/21st Canadian Symposium on Remote Sensing, pp. 891-896 1999.

Orthogonality and Least Squares, http://www.aerostudents.com/files/linearAlgebra/orthogonalityLeast Squares.pdf, Jul. 2009.

International Search Report dated Apr. 27, 2011 of PCT/US2010/024192 filed Feb. 12, 2010 (18 pages).

International Search Report dated Feb. 9, 2009 of PCT/US2008/083738.

Leathers et al., "Scene-based Nonuniformity Corrections for Optical and SWIR Pushbroom Sensors", Optics Express; 13(13): 5136-5150 (Jun. 27, 2005).

* cited by examiner

SYSTEM AND METHOD FOR RAPID CLUSTER ANALYSIS OF HYPERSPECTRAL IMAGES

CROSS-REFERENCE TO RELATED APPLICATIONS

This application is related to U.S. patent application Ser. No. 13/371,160, entitled "System and Method for Hyperspectral Image Compression," filed Feb. 10, 2012, U.S. patent application Ser. No. 13/085,883, entitled "Optimized Orthonormal System and Method for Reducing Dimensionality of Hyperspectral Images," filed Apr. 13, 2011, U.S. patent application Ser. No. 12/475,145, entitled "System and Method for Reducing Dimensionality of Hyperspectral Images," filed May 29, 2009, and U.S. patent application Ser. No. 11/856,588, entitled "Hyperspectral Image Dimension Reduction System and Method," filed Sep. 17, 2007, the disclosures of each of which are hereby incorporated by reference in their entireties.

BACKGROUND

This disclosure relates to analysis of hyperspectral image data, and as described in greater detail below, relates in particular to analysis of dimensionality reduced hyperspectral image data, which may be based on an optimized set of basis vectors. While compression reduces the size of a data set, it typically results in a loss of access to information content. On the other hand, dimensionality reduction techniques provide compression with the ability to extract information from the data set in its reduced size. Thus, while all dimensionality reduction techniques provide compression, not all compression techniques allow for dimensionality reduction.

Hyperspectral sensors can collect image data across a multitude of spectral bands through a combination of technology associated with spectroscopy and remote imaging. Thus, such sensors can capture sufficient information to derive an approximation of the spectrum for each pixel in an image. In addition to having a color value, each pixel in the image additionally has a third dimension for a vector providing distinct information for the pixel over a large spectrum of wavelengths. This contiguous spectrum may be analyzed to separate and evaluate differing wavelengths, which may permit finer resolution and greater perception of information contained in the image. From such data, hyperspectral imaging systems may be able to characterize targets, materials, and changes to an image, providing a detection granularity which may exceed the actual resolution of pixels in the image and a change identification capability that does not require pixel level registration, which may provide benefits in a wide array of practical applications.

Because each pixel carries information over a wide spectrum of wavelengths, the size of a hyperspectral data set may often quickly become unwieldy in terms of the size of data that is being recorded by the hyperspectral sensor. As an example, hyperspectral sensors are often located remotely on satellites or aircraft capable of imaging areas in excess of 500 km×500 km per hour, which may result in the hyperspectral sensors generating anywhere from three to fifteen gigabits of data per second. Where the hyperspectral data needs to be processed in near real time, the large size of the data may introduce latency problems. In some cases, it may be desirable to transmit the data to a remote location for processing or other analysis, which again would make a reduced data size desirable. Additionally, it may be appreciated that large quantities of data may be difficult to analyze.

While lossy and/or lossless compression techniques may increase the transmission and processing rate for hyperspectral images, these techniques also suffer from various drawbacks. For example, while lossy compression methods may be fine for casual photographs or other human viewable images, wherein the data that is removed may be beyond the eye's ability to resolve, applying such lossy compression methods to a hyperspectral data set may remove information that is valuable and desired for further computer or mathematical processing. Such removal of data may undermine the ability to characterize targets, materials, or changes to scenes that are captured in hyperspectral images. Lossless data compression would not remove such valuable information, since lossless algorithms produce a new data set that can subsequently be decompressed to extract the original data set. Although general purpose lossless compression algorithms can theoretically be used on any type of data, existing lossless compression algorithms typically cannot achieve significant compression on a different type data than that which the algorithms were designed to compress. Thus, existing lossless compression algorithms do not provide a suitable guaranteed compression factor for hyperspectral images, and in certain cases, the decompressed data set may even be larger than the original data set.

Dimensionality reduction techniques strike a balance between the loss of data resulting from lossy compression, and the increased processing requirements of lossless techniques. For example, the dimensionality reduction techniques may identify information that is of particular importance, and segregate it such that it is not reduced, while reducing the remaining information that is of less value. Thus, the use of dimensionality reduction on hyperspectral data sets allows for transformation of the hyperspectral image into a more compact form, with little to no loss of the most relevant information. At the same time, it is advantageous for dimensionality reduction techniques to facilitate rapid processing of a reduced hyperspectral image data set. In the case of hyperspectral imaging data, this generally means that the dimensionality reduced data may be exploited for target detection, anomaly detection, material identification, classification mapping, or so on. Typically for dimensionality reduction of hyperspectral images, a family of functions or a set of vectors are found whose arithmetic combination can represent all of the data in a three-dimensional (3D) data set. Hyperspectral image data is generally discrete, so at each X/Y location in a hyperspectral image the spectral data may form elements of a vector. Depending on the nature of these vectors, they may either be characterized as endmembers or basis vectors. While basis vectors span the data obtained from the image, and form a mathematical basis for the data, endmembers are pixels from an imaged scene (or extrapolations of pixels in the scene), that represent the spectra of a pure material found in the scene. In some cases, endmembers are derived such that they enclose or bound the data set (as in a hypervolume or a simplex).

It may be appreciated that image analysis may operate on dimensionality reduced data that is generated from hyperspectral image data that has been processed using one or more of a variety of analysis techniques, or may utilize the results of generating the dimensionality reduced data to operate on the original hyperspectral image data. For example, such image analysis may be applied to the dimensionality reduced output of techniques such as those disclosed in the related applications incorporated by reference above, which compute geometric basis vectors. The image analysis may also be applied to the dimensionality reduced outputs of other hyperspectral image processing mechanisms, including but not limited to Principal Components Analysis, which computes "statistically derived" basis vectors that span a scene in an optimal mean-square sense.

One such image analysis technique is conventionally known as clustering. Clustering is a process which finds pixels that are more similar to each other than to other groups of pixels. In particular, such clustering may be utilized to determine pixels containing like materials and outliers. It may be appreciated that when a scene is being imaged, different materials and different contrast within the scene may form a generally heterogeneous data set. Accordingly, clustering may break up the scene into more homogeneous portions. For example, such clusters may be utilized to create classification maps, which may be useful in characterizing the hyperspectral image. As one non-limiting example, a variety of clusters may be determined from the hyperspectral image data, including a cluster of pixels that represent grass, a cluster of pixels that represent water, a cluster of pixels that represent metal, and so on. It may be appreciated that clustering may also detect anomalies, such as determining those pixels that are outliers from the established clusters (or are identified as among the smallest clusters). Such clusters may further be useful in identifying pixels with similar spectral properties, which may be exploited in further analysis.

In a conventional implementation, clustering may include selecting an initial number of clusters followed by an initial assignment of every pixel to a cluster. In some cases, this assignment may be designated by a user. Tentative center coordinates for each cluster may be formed from the data or selected for each cluster. For example, the centers may be spaced uniformly to one another, or may be randomly distributed in the scene. Pixels may be assigned to the cluster whose center is nearest (e.g., the smallest distance to the center coordinates). The average coordinates of each cluster, including the added pixels, may then be computed to form the cluster center for the next iteration. In the next iteration, pixels would then be reassigned to the various clusters in an iterative process, with the iterations stopping when certain conditions are met. For example, in some implementations, a user-selected number of iterations may be performed. Alternatively, a stability condition may ultimately be reached, which signifies the end of the iterative process. For example, the cluster center may stop moving, or may move less than a certain distance. As another example, fewer than a certain percentage of pixels may change clusters from the past iteration. In still another example, each of the clusters may settle into a predetermined size or density range (e.g., the iterations end when clusters are not too small, too large, or insufficiently dense).

It may therefore be appreciated that conventional clustering is generally a highly iterative and slow process. For example, many iterations of the computations, such as distance comparisons between pixels and each cluster, may be required to establish the clusters of pixels. Accordingly, among other things, it is advantageous to increase the speed at which stable clusters are identified. Speed may be increased by reducing the number of iterations and reducing the computations associated with each iteration. However, it is important that at the end of the clustering processing that pixels are assigned to the correct clusters.

SUMMARY

According to an embodiment, a method for processing hyperspectral image data includes receiving reduced dimensionality data associated with hyperspectral image data, a set of basis vectors associated with generating the reduced dimensionality data from the hyperspectral image data, and anomaly data associated with the hyperspectral image data. The method also includes, using a processor, establishing an initial set of clusters for the reduced dimensionality data, the initial set of clusters having cluster centers being based on the set of basis vectors. The method additionally includes, using the processor, iteratively assigning pixels from the reduced dimensionality data to one of the set of clusters and modifying the cluster centers based on the assigned pixels. The method further includes outputting clustered pixel assignments and modified cluster centers associated with the hyperspectral image data.

According to another embodiment, a system for processing hyperspectral image data includes one or more storage mediums comprising reduced dimensionality data associated with hyperspectral image data, a set of basis vectors associated with generating the reduced dimensionality data from the hyperspectral image data, and anomaly data associated with the hyperspectral image data. The system also includes one or more processors configured to establish an initial set of clusters for the reduced dimensionality data, the initial set of clusters having cluster centers being based on the set of basis vectors. The one or more processors are also configured to iteratively assign pixels from the reduced dimensionality data to one of the set of clusters and modify the cluster center based on the assigned pixels. The one or more processors are further configured to output clustered pixel assignments and modified cluster centers associated with the hyperspectral image data.

Other features of this disclosure and the inventive concept described herein will be apparent to those skilled in the art based on the following drawings and detailed description.

DETAILED DESCRIPTION

Figure 1:
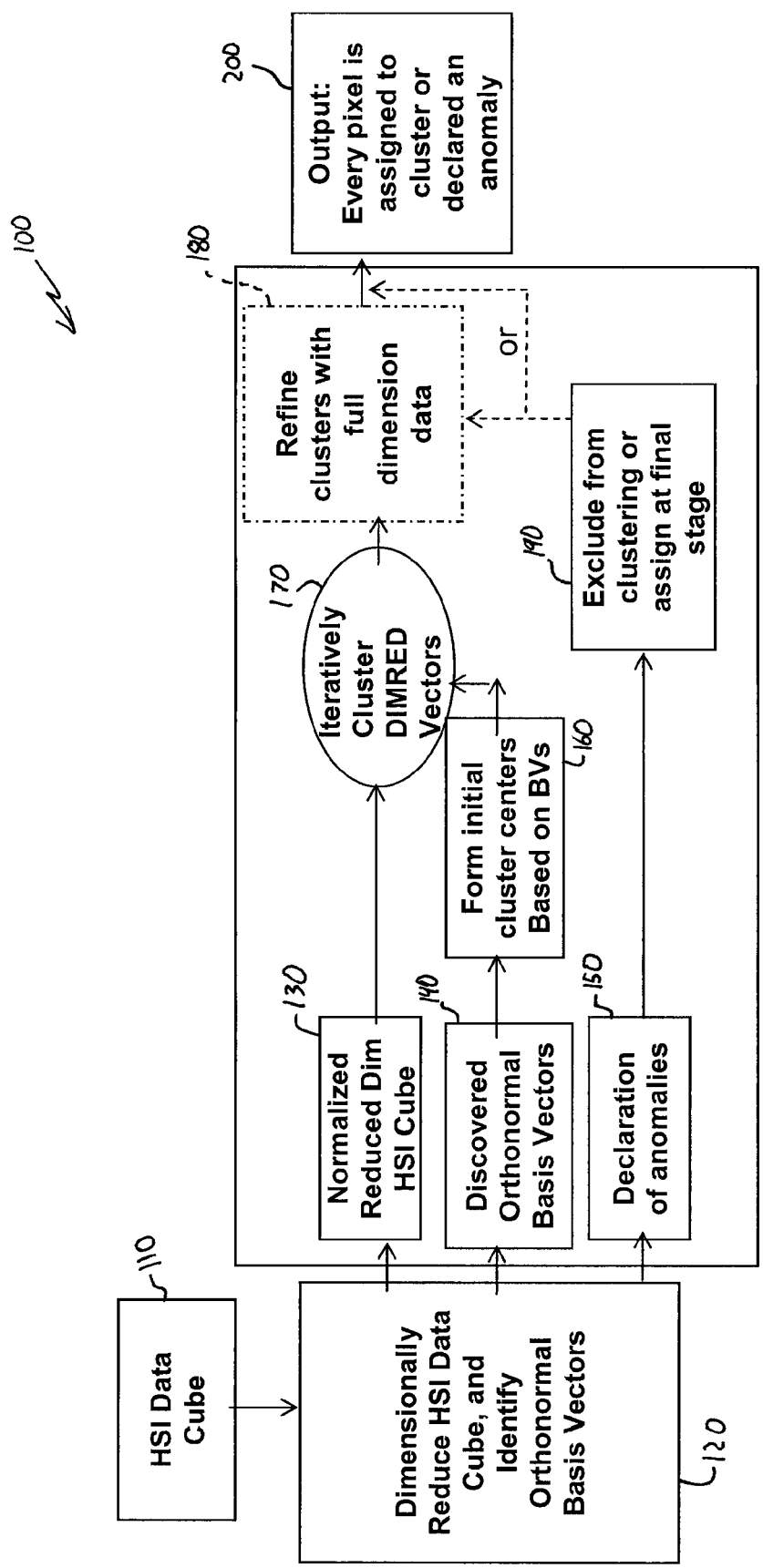
FIG. 1 illustrates an exemplary method for processing one or more hyperspectral images, according to an embodiment.

FIG. 1 illustrates an embodiment of a method of clustering 100. As shown, in an embodiment, the method of clustering may include at 110 receiving a hyperspectral image (HSI) data cube. The hyperspectral image data cube received at 110 may be of any appropriate configuration, or may be received from any appropriate source. For example, a system configured to perform the method of clustering 100 may be the same system that generates the hyperspectral image data. In such an embodiment, receiving the hyperspectral image data cube at 110 may include utilizing the hyperspectral imaging system, which in some embodiments may include a remote imaging system (e.g., a satellite, an aerial surveillance system, or any other system that can capture hyperspectral images). In an embodiment, the hyperspectral imaging system may be configured to capture one or more hyperspectral images of a particular scene corresponding to a geographical area.

As described in greater detail below, in an embodiment, the hyperspectral imaging system may include one or more scan mirrors, or may include other optics arranged to receive light from one or more ground resolution cells. In an embodiment, scan mirrors or the other optics may then direct light through a dispersing element, which may be arranged to separate the light into various different wavelengths (i.e. a spectra). After being separated into the various different wavelengths, the light may then be directed to one or more imaging optics, which may focus the various wavelengths onto a detector array. As such, the detector array may capture hyperspectral image data across the spectrum of wavelengths, thereby generating a data set corresponding to a hyperspectral image of scene. The hyperspectral image data may be understood as generally containing two spatial dimensions, corresponding to the scene, and a third spectral dimension. Accordingly, the hyperspectral image data may be characterized as the hyperspectral data cube, received at 110. In some embodiments, the hyperspectral image data may be characterized as vectors, having an X,Y spatial coordinate, and a set of values in the spectral dimension (e.g., associated with particular wavelength values).

In some embodiments, a system configured to perform the method of clustering 100 may be separate and discrete from that configured to capture or otherwise generate the hyperspectral image data cube. In such an embodiment, receiving the hyperspectral image data cube at 110 may include accessing stored hyperspectral image data, either stored locally to the system performing the method of clustering 100, or coupled to such a system (e.g., through a network).

It may be appreciated that the method of clustering 100 may be configured to utilize basis vectors associated with the hyperspectral image data, and a dimensionally reduced configuration of the hyperspectral image data, to improve clustering of the pixels thereof. In some embodiments where a hyperspectral image data cube is received at 110, method 100 may continue at 120 by dimensionally reducing the hyperspectral image data cube, and identifying basis vectors associated therewith. It may be appreciated that in some embodiments the dimensionality reduction at 120 may be performed on a separate system as that performing the method of clustering 100. In some embodiments, the dimensionality reduction at 120 may be performed by the system configured to receive the hyperspectral image data cube at 110. As described in greater detail below, in some such embodiments, the method of clustering 100 may include receiving outputs from the dimensionality reduction at 120, which may be stored on the system performing the method of clustering 100, or on a system networked therewith (including, for example, the system that performed the dimensionality reduction at 120). Alternatively, the outputs from the dimensionality reduction at 120 may be otherwise transferred to the system performing the method of clustering 100. Although the dimensionalities of the hyperspectral image data received at 110 and the reduced dimensionality data generated at 120 may vary across embodiments, in one non-limiting embodiment, the hyperspectral image data may include approximately 256 spectral dimensions, while the reduced dimensionality data may include approximately 15 spectral dimensions.

Reducing the dimensionality of the hyperspectral image data cube at 120, whether performed as part of the method of clustering 100 or otherwise, may vary across embodiments. Specifically, in an embodiment, while the dimensionally reduced configuration retains the same number of spatial pixels as the original hyperspectral image data, the number of elements in the spectral dimension may be reduced. It may be appreciated that in some embodiments, the dimensionally reduced data may also be treated as a set of vectors (e.g., dimensionally reduced vectors), having an X,Y spatial coordinate, and a set of values associated therewith, indicating the reduced dimensionality data. In the illustrated embodiment, the performing the dimensionality reduction of the hyperspectral image data at 120 includes identifying a set of basis vectors. In some embodiments, the set of basis vectors identified may be orthogonal to one another. In some more particular embodiments, such as that illustrated in FIG. 1, the set of basis vectors may be orthonormal to one another, as described in greater detail below.

In some embodiments, set of basis vectors identified at 120 may be utilized to reduce the dimensionality of the hyperspectral image data by unmixing. Unmixing may be unconstrained unmixing or constrained so that unmixing coefficients are non-negative and/or sum to unity. In preferred embodiments, unconstrained unmixing may be employed with the dimensionality reduction at 120, as it is generally faster and simpler than other unmixing techniques, and the basis vectors derived are not intended nor required to be endmembers. It may be appreciated that the number of basis vectors needed to accurately represent the hyperspectral image data may vary depending on the processing technique. In this context, the arithmetic combination of the basis vectors provide a very good approximation to each pixel but need not be mathematically perfect (i.e. completely spanning). While some processing techniques, such as Principal Components Analysis, compute a basis vector for every color of hyperspectral data (although not all are necessarily retained), in other processing techniques, such as that described in U.S. patent application Ser. No. 13/085,883, the number of basis vectors computed is a user-selectable variable.

Regardless of the method of generating the dimensionality reduced data, and the set of basis vectors associated therewith, it may be appreciated that method of clustering 100 may include at 130 receiving the dimensionality reduced data. The computation of distance from a pixel to all cluster centers is significantly faster using the dimensionality reduced data than full dimension data. In embodiments where the dimensionality reduced data was generated in a separate process, at a later time, or on a separate computational system, receiving the dimensionality reduced data at 130 may include accessing the dimensionality reduced data from a storage medium. The storage medium may include a hard drive, flash drive, removable media, network storage, the internet, the "cloud," another system, or any other appropriate device. It may be appreciated that in some embodiments the dimensionality reduced data may be loaded into the random access memory, or other such memory or cache associated with the system performing the method of clustering 100, or associated with the system storing the dimensionality reduced data. As shown in the illustrated embodiment, in some embodiments the dimensionality reduced data received at 130 may be normalized. Such normalization may comprise scaling the vector of the dimensionally reduced data to unity for each pixel. It may be appreciated that such normalization may be utilized where initial cluster centers are set using the basis vectors (an option in some embodiments).

The method of clustering 100 may also include at 140 receiving the set of identified orthonormal basis vectors. In embodiments where the set of basis vectors were computed in a separate process, at a later time, or on a separate computational system, receiving the identified set of basis vectors at 140 may include accessing the set of basis vectors from a storage medium. In some embodiments, the set of basis vectors may be stored with or otherwise be located with the dimensionality reduced data, as described above. In other embodiments, the set of basis vectors received at 140 may be stored separately from the dimensionality reduced data, and may be stored in an associated separate storage medium, which may be of any appropriate configuration, including those described above. It may be appreciated that in some embodiments the set of basis vectors may be loaded into the random access memory, or other such memory or cache associated with the system performing the method of clustering 100, or associated with the system storing the set of basis vectors.

As described in greater detail below, it may be appreciated that in some embodiments the orthonormal basis vectors may each have the full number of dimensions as the unreduced hyperspectral image data, greater than the reduced number of dimensions of the dimensionally reduced data. It may be appreciated that where the basis vectors are orthonormal, the process of reducing the dimensionality thereof may form a vector that has a single element "1" and a plurality of elements "0", the difference therebetween being the position of the element "1" within the elements "0." Accordingly, in some embodiments, receiving the orthonormal basis vectors at 140 may comprise receiving dimensionally reduced orthonormal basis vectors, while in other embodiments, receiving the orthonormal basis vectors at 140 may comprise receiving orthonormal basis vectors, then dimensionally reducing the orthonormal basis vectors into dimensionally reduced orthonormal basis vectors.

Further shown in FIG. 1 is that in an embodiment, the method of clustering 100 may include at 150 declaring anomalies associated with the hyperspectral image data. In some embodiments, the anomalies may be identified as pixels from the hyperspectral image that have been set aside from the dimensionality reduction. For example, in an embodiment an adaptive error threshold may be applied during the dimensionality reduction, such that anomalous pixels having a larger residual magnitude than the worst case error on the reduced pixel may be set aside as "raw" pixels. As such, in various embodiments the dimensionally reduced hyperspectral image data which may be received at 130, may include both anomalous pixels and dimensionally reduced pixels for some or all of the hyperspectral image data. Alternatively, the anomalies declared at 150 may be identified as particular pixels within the hyperspectral image data cube received or otherwise accessed at 110, and declaring the anomalies at 150 may include receiving those pixels separately from the hyperspectral image data.

The method of clustering 100 further includes at 160 forming initial cluster centers for the dimensionally reduced data cube. In an embodiment, the number of clusters may be user-defined. In an embodiment, a number of constraints may be applied to the clusters, including but not limited to a constraint on the center of the clusters. It may be appreciated that in an embodiment, the initial cluster centers may be based on the dimensionally reduced orthonormal basis vectors received at 140. In particular, the dimensionally reduced basis vectors themselves may constitute a coordinate system that defines the initial cluster center, such that the clustering process may be started along each axis of the orthonormal set of axes determined by the set of dimensionally reduced orthonormal basis vectors. For example, the pixels of the dimensionally reduced data that formed the orthonormal basis vectors may be treated as the initial cluster centers. Accordingly, in some embodiments, there may be as many clusters are there are basis vectors. In some embodiments, the basis vectors may be ranked (e.g., in order of greatest to least contribution to the imaged scene), and as such, where there are fewer clusters than basis vectors, the initial cluster centers may be established based on the highest ranked basis vectors. In some embodiments, during generation of the dimensionally reduced data and the basis vectors, specific pixels in the scene may be selected as unique, such that the residual spectrum of those pixels become new basis vectors. The initial cluster centers may then be formed from some or all of the dimensionally reduced vectors of these selected pixels. Where there are multiple pixels with similar coefficients, they may be assigned to the nearby cluster center. Such assignments based on these similarities may be preferential, as random assignments are more likely to lead to large numbers of pixels being re-assigned to another cluster after an iteration, causing larger changes in cluster centers after an iteration, causing yet more pixels to be reassigned.

Additionally, all pixels of the dimensionally reduced data may be initially assigned to the cluster whose center is nearest (e.g., smallest distance). Although the distance may be computed in a variety of ways across embodiments, in some embodiments, the distance may be computed as the Euclidean distance (e.g., the geometric distance), or may be computed as the Mahalanobis distance (e.g., the distance being weighted by a spectral covariance of the cluster).

Having formed the initial cluster centers at 160, the method of clustering 100 may continue at 170 by iteratively clustering the reduced dimensionality vectors. Specifically, all pixels are assigned to a cluster, and the average values of all those pixels in each cluster are computed. The average then becomes the new center (as it is likely different than the initial average). The distance from each pixel to each new cluster center is then tested. If a pixel is closer to the center of a different cluster, it is reassigned to that cluster. As described in greater detail below, in some embodiments the anomalies are excluded from the iterative clustering at 170, however may be utilized subsequently in the method of clustering 100. It may be appreciated that the iterative clustering at 170 may include in particular recomputing the average coordinate of the cluster following population of the cluster by the reduced dimensionality vectors, which may form a new cluster center for the next iteration. The pixels (i.e., the reduced dimensionality vectors) may then be reassigned to the cluster whose center is nearest. The iterative clustering at 170 may therefore continue until a completion condition is met. As indicated above, in some embodiments, the number of iterations may be user-defined. In other embodiments, a termination condition may apply. For example, if the cluster center does not move, or moves less than a certain (e.g., user defined or pre-determined) amount, from one iteration to the next, the clusters may be considered stable, and the iterations at 170 may conclude. As another example, if less than a certain (e.g., user defined or pre-determined) number of pixels change clusters, then the clusters may also be considered stable. Other cluster rules may be applied to determine when the iterative clustering at 170 may conclude. It may be appreciated that in embodiments where the number of pixels, or the size of cluster center movement, are utilized as a stability condition, and are user defined, the defined threshold value may be input by any appropriate mechanism, including through any suitable user interface. In some embodiments utilizing pixels changing clusters as a pre-determined stability condition, the stability condition for pixels changing clusters may be, for example, set as less than a number of the pixels (e.g., less than 50 pixels changing clusters), or may be set as less than a fraction or percent of the overall pixels (e.g., less than 5% of the pixels changing clusters). Likewise, in embodiments where movement of the cluster center is a stability condition, the stability condition may be determined as by a number of pixels (e.g., movement of the cluster center is less than 5 pixels from the prior iteration), or may be as a fraction or percentage (e.g., movement of the cluster center is less than 5% from the prior iteration, compared to the further preceding iteration). It may be appreciated that in various embodiments, constraints on the rules by which the clustering at 170 proceeds may be applied. As one non-limiting example, in an embodiment, the initial clusters may be prevented from splitting or merging during the iterations.

As a "safety net" to ensure that all pixels are assigned to the correct cluster, once the iterative clustering at 170 is complete, the method of clustering 100 may continue at 180 by optionally refining the clusters with full dimension hyperspectral image data. In an embodiment, such refining may comprise replacing the dimensionally reduced pixels in each cluster with the original hyperspectral image data associated therewith. As shown at 190, in such an embodiment, the anomalies declared at 150 may be reincorporated into the refined clusters optionally established at 180. In an embodiment, the refining at 180 may include computing one or more refining iterations of the clustering utilizing the anomalous pixels. Avoiding inclusion of the anomalous pixels in the initial clustering is intended to reduce the number of iteration. Anomalies are highly likely to switch assignments between clusters during an early iteration. While a configuration including the anomalies declared at 150 in the iterative clustering at 170 might generally cause excessive iteration, in particular where the iterative clustering at 170 utilizes a stability condition to terminate instead of a set number of iterations, it may be appreciated that excluding the anomalies from the iterative clustering at 170, however subsequently utilizing the anomalies declared at 150 to refine the clusters at 180, may facilitate a more accurate set of clusters. In some embodiments, the refining at 180 may utilize a separate set of termination conditions. For example, in an embodiment the refining at 180 may include only a single further iteration to incorporate the full dimension data (e.g., including the anomalies). In an embodiment, the refining at 180 may include a plurality of further iterations including the same. In some embodiments where the refining at 180 includes a plurality of further iterations, the number of further iterations may be user defined, or may utilize a stability condition to terminate, including but not limited to those described above. As further shown at 190, in other embodiments, the anomalies may be excluded from clustering and the refining, and may be treated separately instead of being assigned following the iterative clustering at 170.

As shown in the method of clustering 100, in an embodiment, following the optional refining at 180, every reduced dimensionality pixel (or full dimensioned data that has replaced the reduced dimension pixel), may either be assigned to one of the clusters, or may be excluded from clustering and declared an anomaly. As shown, in an embodiment the method of clustering 100 may include at 200 outputting the clustered data. In an embodiment, outputting the clustered data at 200 may comprise outputting a classification map. For example, where the clusters represent different materials, the classification of each cluster may correspond to identification of the materials in the scene. As a specific example, those pixels representing a first material (e.g., water) may be highlighted as such in the classification map, while those pixels representing a second material (e.g., earth) may be highlighted differently from the first material. In an embodiment, anomalies may also be output at 200. In an embodiment, outputting the anomalies at 200 may include declaring certain pixels as anomalous, which may include highlighting them in the classification map as anomalous pixels. While in some embodiments all anomalous pixels may be highlighted as such with the same identifier indicating that the pixel is anomalous, on other embodiments where the anomalous pixels are distinct from one another, declaring the anomalous pixels may include providing a separate identifier for each anomalous pixel. For example, each distinct anomalous pixel or anomalous set of pixels may be treated as a separate cluster.

It may be appreciated that receiving or accessing data in the method of clustering 100, including, for example, receiving the reduced dimensionality hyperspectral image data cube at 130, the orthonormal basis vectors at 140, and the declared anomalous pixels at 150, may be performed at any time, and/or in any order. For example, the data may be received from storage and loaded into active memory for use as needed, or may be received all at once (e.g., simultaneously). Accordingly, the flowchart of FIG. 1, and the order of operations therein, is merely exemplary.

Figure 2:
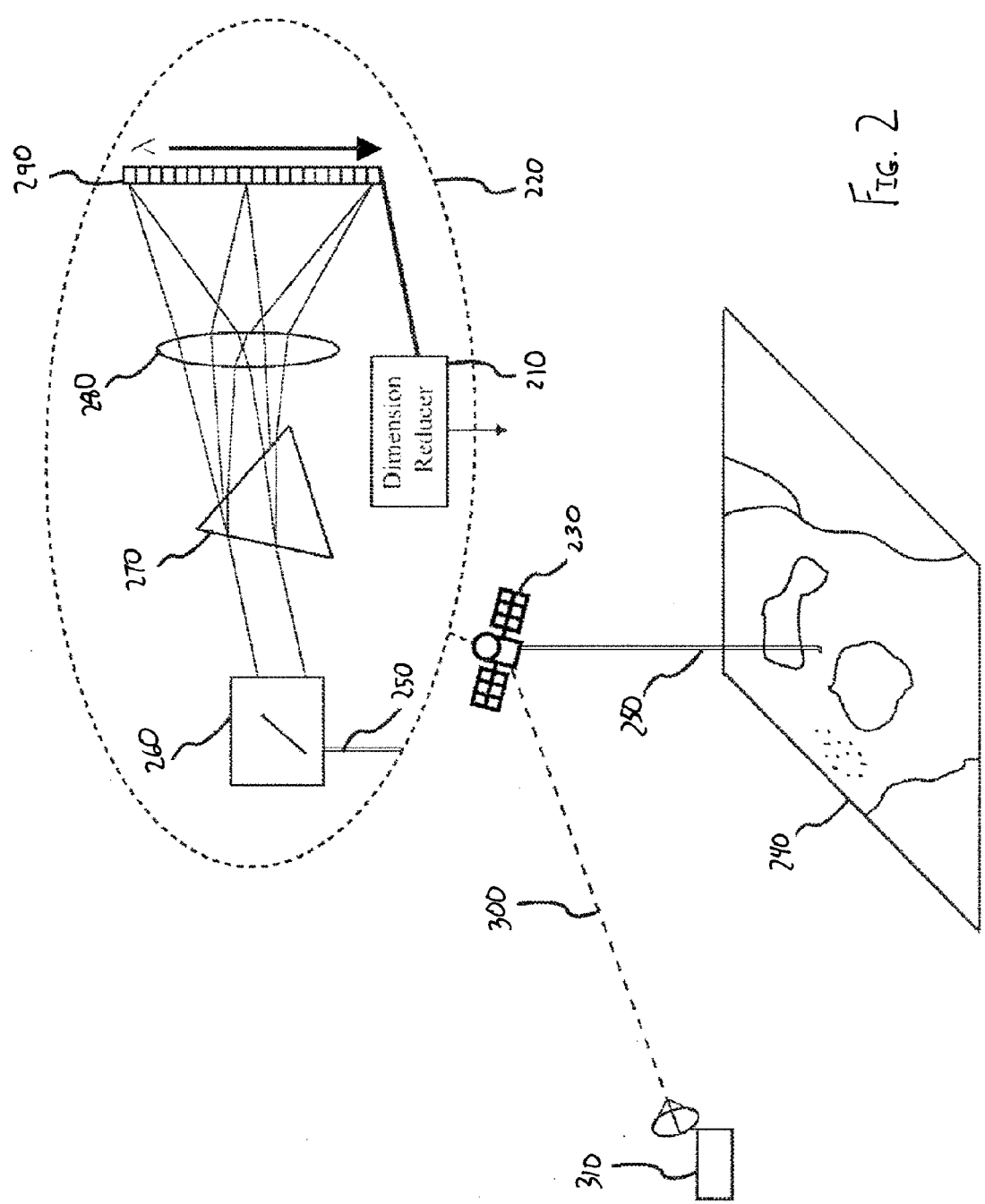
FIG. 2 illustrates an embodiment of a system configured to generate hyperspectral images.

As noted above, in various embodiments the hyperspectral image data cube received at 110 may be received from any appropriate source. Additionally, in some embodiments, a system configured to perform the method of clustering 100 may be the same system that generates the hyperspectral image data. In other embodiments, the system that generates the hyperspectral image data may be linked to the system that performs the method of clustering 100 through any appropriate mechanism. FIG. 2 illustrates an exemplary image dimension reduction system ("IDRS") 210 incorporated as part of a hyperspectral image system 220 provided by a satellite 230. The satellite 230 is tasked to image a geographical area 240, and in so doing receives light 250 from a single ground-resolution cell. To generalize the basic elements provided by a hyperspectral image system 220 and the general method of operation, the light 250 is received by scan mirrors 260 and or other optics that direct the light through at least one dispersing element 270. The dispersing element separates wavelengths and provides them to imaging optics 280 which in turn focus the wavelengths upon an array of detectors 290 arranged to capture data information across a spectrum of wavelengths. The hyperspectral data is then processed by IDRS 210 for transmission 300 to a ground station 310.

Figure 3:
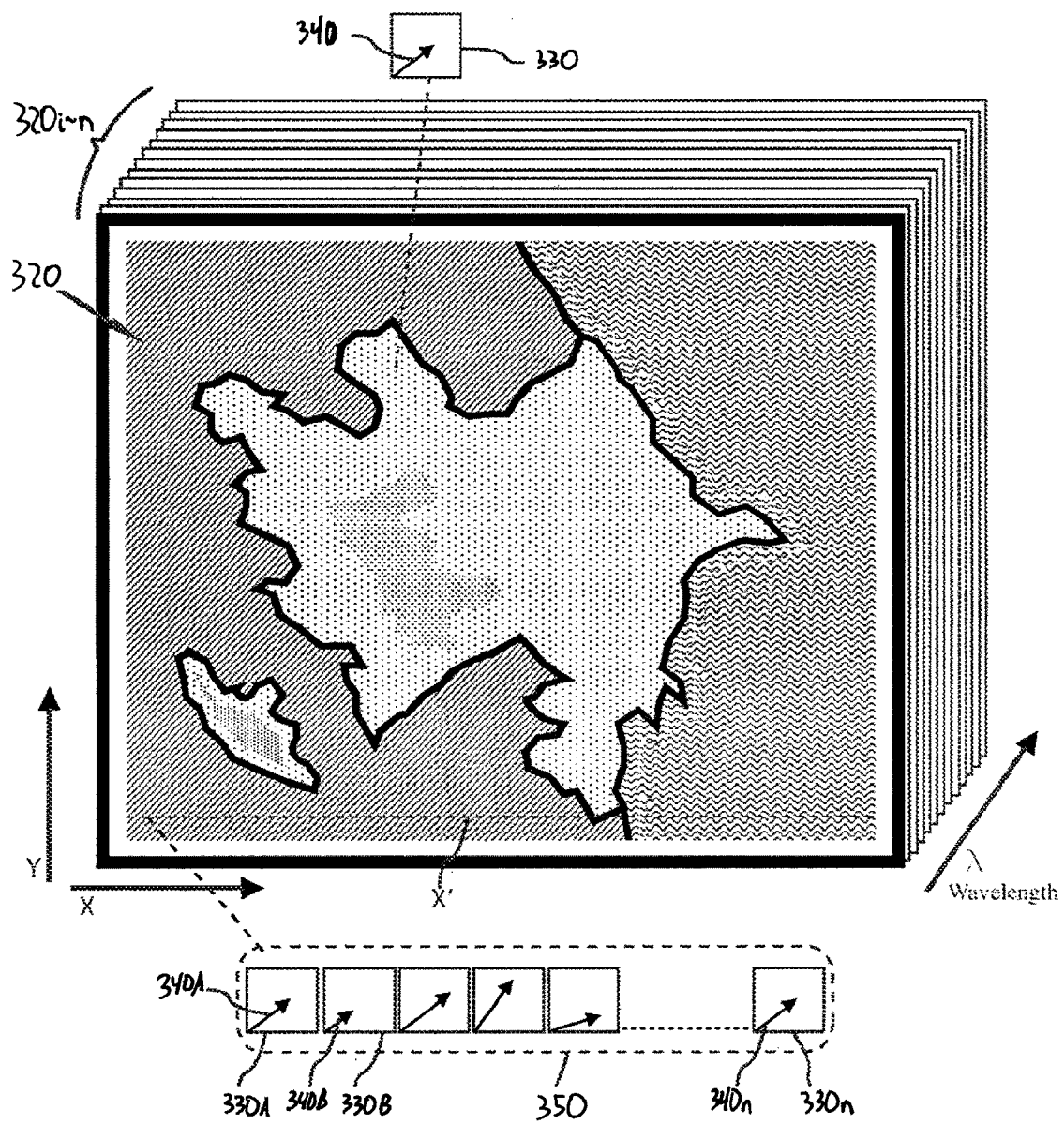
FIG. 3 illustrates an exemplary hyperspectral image which may be processed according to the method depicted in FIG. 1.
Figure 4:
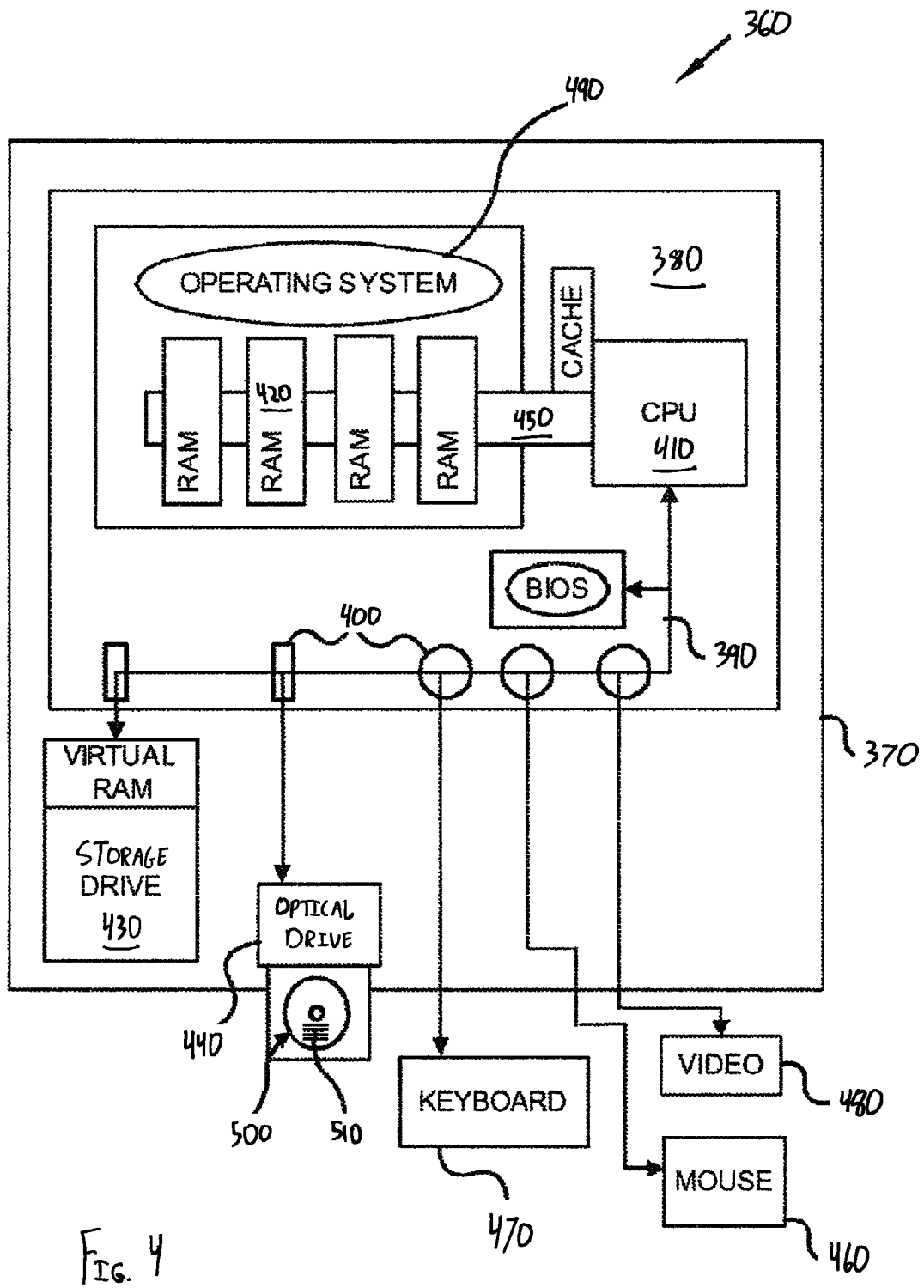
FIG. 4 is a block diagram of a computer system in accordance with one or more embodiments.

While the hyperspectral image data cube created by the hyperspectral image system 200 may vary across embodiments, FIG. 3 illustrates an embodiment of a hyperspectral image 320 (i.e., a hyperspectral image data cube) including constituent images (e.g., images 320*i~n*) acquired simultaneously in many different adjacent wavelength bands. As indicated, the image is comprised of pixels arranged in an X-Y coordinate system. Under appropriate circumstances, alternative coordinate systems may be employed, however X-Y is represented herein for ease of illustration and discussion, and not by way of limitation. Each pixel 330 of the hyperspectral image 320 has a spectral vector 340. The spectral vector 340 contains at least some number of spectral measurements of the energy upwelling from that pixel. As indicated in an enlarged section 350, of row X' the spectral vector 340A of the initial pixel 330A may well be different from the spectral vectors 340B-340*n* for pixels 330B-330*n*. As discussed above, in some embodiments the hyperspectral image 320 may be received at 110, and may be dimensionally reduced at 120 in the method of clustering 100.

Although various embodiments of the method of clustering 100 described herein may be implemented on any appropriate system or hardware, in some embodiments, the method of clustering 100 may be implemented on a computer system, which may generally include typical computer components such as one or more processors, memory modules, storage devices, input and output devices, and so on. In an embodiment, the method of clustering 100 may be maintained in an active memory of the computer system to enhance speed and efficiency, and may further be coupled to a computer network and utilize distributed resources associated with the computer network. In various embodiments, a system configured to implement the method of clustering 100 may include one or more interfaces, one or more spectrum readers, and one or more modules that may perform establishing the BV set, decomposing the hyperspectral image, and evaluating the hyperspectral image. In some embodiments, the one or more interfaces may be configured to receive data corresponding to one or more hyperspectral images, one or more BVs provided by a user, an indication as to whether dimensionality reduction is to be performed as a lossy or lossless operation, tolerance levels for the amount of lost data in the dimensionality reduction, and/or other information relating to the processing and/or analyzing of hyperspectral images. In an embodiment, the one or more interfaces may be arranged to receive information directly from the user via an input device associated with the system, or directly from a component of the system, including, for example, a hyperspectral imager.

According to an embodiment, implementations of the various systems and methods for reducing dimensionality of hyperspectral images described herein may be made in hardware, firmware, software, or various combinations thereof. For example, the systems and methods for reducing dimensionality of hyperspectral images may be implemented as computer executable instructions stored on a non-transitory machine readable medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, and other media for storing information, and a machine readable transmission media may include signals such as carrier waves, infrared signals, digital signals, and other media for transmitting information. Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

FIG. 3 illustrates a high level block diagram of an exemplary computer system 360 which may be used to perform the method of clustering 100, and/or similar embodiments. It may be appreciated that in some embodiments, the IRDS 210 may include some or all of the computer system 360. In some embodiments, the computer system 360 may be linked to or otherwise associated with the ground station 310. In an embodiment the computer system 360 has a case 370, enclosing a main board 380. The main board has a system bus 390, connection ports 400, a processing unit, such as Central Processing Unit (CPU) 410, and a data storage device, such as main memory 420, storage drive 430, and optical drive 440. Each of main memory 420, storage drive 430, and optical drive 440 may be of any appropriate construction or configuration. For example, in some embodiments storage drive 430 may comprise a spinning hard disk drive, or may comprise a solid-state drive. Additionally, optical drive 440 may comprise a CD drive, a DVD drive, a Blu-ray drive, or any other appropriate optical medium.

Memory bus 450 couples main memory 420 to CPU 410. A system bus 390 couples storage drive 430, optical drive 440, and connection ports 400 to CPU 410. Multiple input devices may be provided, such as for example a mouse 460 and keyboard 470. Multiple output devices may also be provided, such as for example a video monitor 480 and a printer (not shown). It may be appreciated that the input devices and output devices may alternatively be local to the case 370 and the computer system 360, or may be located remotely (e.g., interfacing with the computer system 360 through a network or other remote connection).

Computer system 360 may be a commercially available system, or may be proprietary design. In some embodiments, the computer system 360 may be a desktop workstation unit, and may be provided by any appropriate computer system provider. In some embodiments, computer system 360 comprise a networked computer system, wherein memory storage components such as storage drive 430, additional CPUs 410 and output devices such as printers are provided by physically separate computer systems commonly tied together in the network. Those skilled in the art will understand and appreciate the physical composition of components and component interconnections comprising computer system 360, and select a computer system 360 suitable for performing the methods disclosed herein.

When computer system 360 is activated, preferably an operating system 490 will load into main memory 420 as part of the boot sequence, and ready the computer system 360 for operation. At the simplest level, and in the most general sense, the tasks of an operating system fall into specific categories—process management, device management (including application and user interface management) and memory management.

In such a computer system 360, the CPU 410 is operable to perform one or more embodiments of the methods described above. Those skilled in the art will understand that a computer-readable medium 500 on which is a computer program 510 for performing the methods (e.g., the method of clustering 100) disclosed herein may be provided to the computer system 360. The form of the medium 500 and language of the program 510 are understood to be appropriate for computer system 360. Utilizing the memory stores, such as one or more storage drives 430 and main system memory 420, the operable CPU 410 will read the instructions provided by the computer program 510 and operate to perform the method of clustering 100 as described above.

It may be appreciated that aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

What is claimed is:

1. A method for processing hyperspectral image data, comprising:

receiving reduced dimensionality data associated with hyperspectral image data, the data including a set of pixels each represented by a spectral vector, a set of basis vectors associated with generating the reduced dimensionality data from the hyperspectral image data, and anomaly data associated with the hyperspectral image data;

using a processor, establishing an initial set of clusters for the reduced dimensionality data, the initial set of clusters having cluster centers being based on the set of basis vectors;

using the processor, iteratively assigning pixels from the reduced dimensionality data to one of the set of clusters and modifying the cluster centers based on the assigned pixels, for a given cluster, the pixels assigned to the given cluster being similar in that they have similar distances to the cluster center of the given cluster;

outputting clustered pixel assignments and modified cluster centers associated with the hyperspectral image data; and wherein iteratively assigning pixels includes excluding anomalous pixels, which correspond to the anomaly data, from being assigned to the set of clusters.

2. The method of claim 1, wherein the set of basis vectors comprise orthogonal basis vectors.

3. The method of claim 2, wherein the orthogonal basis vectors comprise orthogonal basis vectors.

4. The method of claim 1, wherein iteratively assigning pixels from the reduced dimensionality data to the set of clusters comprises computing a distance between a pixel of the reduced dimensionality data and one or more of the cluster centers.

5. The method of claim 4, wherein the distance is computed as the Euclidean distance or the Mahalonbis distance.

6. The method of claim 1, wherein the iteratively assigning is configured to prevent splitting or merging of the plurality of clusters.

7. The method of claim 1, wherein the iteratively assigning is configured to continue for a fixed number of iterations.

8. The method of claim 7, wherein the fixed number of iterations is user-defined.

9. The method of claim 1, wherein the iteratively assigning is configured to continue until a stability condition is met.

10. The method of claim 9, wherein the stability condition comprises obtaining a smaller than threshold amount of movement in a center of one or more of the set of clusters from a prior iteration to a subsequent iteration.

11. The method of claim 9, wherein the stability condition comprises obtaining a smaller than threshold amount of reassignment of the reduced dimensionality data among the set of clusters.

12. The method of claim 1, further comprising refining the set of clusters with the hyperspectral image data.

13. The method of claim 12, wherein the refining comprises converting the reduced dimensionality data into full dimensionality data following the iterative clustering.

14. The method of claim 13, further comprising performing one or more additional iterations of the iteratively assigning pixels utilizing the full dimensionality data.

15. The method of claim 14, wherein a number of the one or more additional iterations are user-defined.

16. The method of claim 14, wherein the one or more additional iterations are configured to continue until a stability condition is met.

17. The method of claim 14, wherein the full dimensionality data incorporates the anomaly data.

18. A system for processing hyperspectral image data, the system comprising:

one or more storage mediums comprising reduced dimensionality data associated with hyperspectral image data, the hyperspectral image data including a set of pixels each represented by a spectral vector, a set of basis vectors associated with generating the reduced dimensionality data from the hyperspectral image data, and anomaly data associated with the hyperspectral image data; and one or more processors configured to:

establish an initial set of clusters for the reduced dimensionality data, the initial set of clusters having cluster centers being based on the set of basis vectors;

iteratively assign pixels from the reduced dimensionality data to one of the set of clusters and modify the cluster center based on the assigned pixels, for a given cluster, the pixels assigned to the given cluster being similar in that they have similar distances to the cluster center of the given cluster;

output clustered pixel assignments and modified cluster centers associated with the hyperspectral image data; and exclude anomalous pixels, which correspond to the anomaly data, from being assigned to the set of clusters.

19. The method of claim 1, further comprising, provided with reduced dimensionality versions of the basis vectors, establishing initial cluster centers based on at least one of the reduced dimensionality versions of the basis vectors.

* * * * *